(12) United States Patent
Jiang et al.

(10) Patent No.: US 9,288,453 B2
(45) Date of Patent: Mar. 15, 2016

(54) METHOD AND DEVICE FOR LOSSY ENCODING DATA AND CORRESPONDING DEVICE FOR RECONSTRUCTING DATA

(75) Inventors: Wenfei Jiang, Beijing (CN); Zhibo Chen, Beijing (CN); Fan Zhang, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 169 days.

(21) Appl. No.: 14/113,005

(22) PCT Filed: Apr. 22, 2011

(86) PCT No.: PCT/CN2011/000705
§ 371 (c)(1),
(2), (4) Date: Oct. 21, 2013

(87) PCT Pub. No.: WO2012/142731
PCT Pub. Date: Oct. 26, 2012

(65) Prior Publication Data
US 2014/0037223 A1     Feb. 6, 2014

(51) Int. Cl.
*G06K 9/36*     (2006.01)
*H04N 19/50*    (2014.01)
(Continued)

(52) U.S. Cl.
CPC ............. *H04N 7/325* (2013.01); *H04N 19/124* (2014.11); *H04N 19/132* (2014.11);
(Continued)

(58) Field of Classification Search
CPC ......... H04N 7/325; H04N 7/30; H04N 19/50; H04N 19/147; H04N 19/60; H04N 19/124; H04N 19/132; H04N 19/18; H04N 19/467; H04N 19/86
USPC .......................................... 382/232–233, 238
See application file for complete search history.

(56) References Cited

U.S. PATENT DOCUMENTS

| 5,321,522 | A   |   | 6/1994 | Eschbach |         |
|-----------|-----|---|--------|----------|---------|
| 6,252,994 | B1  | * | 6/2001 | Nafarieh | 382/253 |

(Continued)

FOREIGN PATENT DOCUMENTS

| EP | 2046045    | 4/2009 |
|----|------------|--------|
| JP | 2003509913 | 3/2003 |

(Continued)

OTHER PUBLICATIONS

Lin et al., "A Covert Communication Scheme for A DCT Based Image Multiple Description Coding", 2007 Third International Conference Intelligent Information Hiding and Multimedia Signal Processing, Nov. 26, 2007, pp. 1-4.

(Continued)

*Primary Examiner* — Kanjibhai Patel
(74) *Attorney, Agent, or Firm* — Tutunjian & Bitetto, P.C.

(57) ABSTRACT

The invention proposes modification of quantized coefficients for signalling of a post-processing method. Therefore, it is proposed a method for lossy compress-encoding data comprising at least one of image data and audio data. Said method comprises determining quantized coefficients using a quantization of a discrete cosine transformed residual of a prediction of said data. Said method further comprises modifying said quantized coefficients for minimizing rate-distortion cost wherein distortion is determined using a post-processed reconstruction of the data, the post-processed reconstruction being post-processed according to a post¬processing method, and compress-encoding said modified coefficients. In said proposed method, the post-processing method is that one of n>1 different predetermined post processing method candidates whose position in an predetermined order of arrangement of the post processing method candidates equals a remainder of division, by n, of a sum of the modified coefficients. Doing so removes the overhead of flags in the bit stream.

15 Claims, 3 Drawing Sheets

(51) Int. Cl.
| | |
|---|---|
| H04N 19/147 | (2014.01) |
| H04N 19/60 | (2014.01) |
| H04N 19/124 | (2014.01) |
| H04N 19/132 | (2014.01) |
| H04N 19/18 | (2014.01) |
| H04N 19/467 | (2014.01) |
| H04N 19/86 | (2014.01) |

(52) U.S. Cl.
CPC ............ *H04N 19/147* (2014.11); *H04N 19/18* (2014.11); *H04N 19/467* (2014.11); *H04N 19/50* (2014.11); *H04N 19/60* (2014.11); *H04N 19/86* (2014.11)

(56) References Cited

U.S. PATENT DOCUMENTS

| | | | | |
|---|---|---|---|---|
| 6,801,665 | B1 * | 10/2004 | Atsumi et al. | 382/239 |
| 7,577,305 | B2 * | 8/2009 | Srinivasan | 382/238 |
| 8,059,721 | B2 * | 11/2011 | Chang | H04N 19/61 375/240.18 |
| 8,442,337 | B2 * | 5/2013 | Zuo et al. | 382/251 |
| 2002/0080408 | A1 | 6/2002 | Budge et al. | |
| 2009/0110066 | A1 | 4/2009 | Wang et al. | |
| 2009/0196513 | A1 | 8/2009 | Tian et al. | |
| 2010/0080473 | A1 | 4/2010 | Han et al. | |

FOREIGN PATENT DOCUMENTS

| | | |
|---|---|---|
| JP | 2003526274 | 9/2003 |
| WO | WO-9929115 | 6/1999 |
| WO | WO0119071 | 3/2001 |
| WO | WO0167671 | 9/2001 |
| WO | WO2008063334 | 5/2008 |

OTHER PUBLICATIONS

Sanei et al., "A Compressive Sensing Approach for Progressive Transmission of Images", 2009 16th International Conference on Digital Signal Processing (DSP), Jul. 7, 2009, pp. 1-5.

Chen et al., "Dynamic measurement rate allocation for distributed compressive video sensing", Proceedings of the SPIE—The international Society for Optical Engineering, Jul. 11, 2010, vol. 7744, pp. 1-10.

Liu et al., "Block-Based Adaptive Compressed Sensing for Video", 2010 Proceedings of 17th IEEE Conference on Image Processing (ICIP 2010), Hong Kong, Sep. 26, 2010, pp. 1649-1652.

Han et al., "Multi image fusion based on compressive sensing", 2010 International Conference on Audio, Language and Image Processing (ICALIP), Nov. 23, 2010, pp. 1463-1469.

Do et al., "Compressive sensing with adaptive pixel domain reconstruction for block-based video coding", International Conference on Image Processing (ICIP 2010), Hong Kong, Sep. 26, 2010, pp. 3377-3380.

Thiesse et al., "Data hiding of motion information in chroma and luma samples for video compression", 2010 IEEE International Workshop on Multimedia Signal Processing (MMSP'10), Saint-Malo, France, Oct. 4, 2010, pp. 217-221.

Thiesse et al., "Data hiding of intra prediction information in chroma samples for video compression", 2010 17th International Conference on Image Processing (ICIP 2010), Hong Kong, Sep. 26, 2010, pp. 2861-2864.

Urhan et al., "Parameter Embedding Mode and Optimal post-process Filtering for Improved WDCT Image Compression", IEEE Transactions on Circuits and Systems for Video Technology, vol. 18, No. 4, Apr. 1, 2008, pp. 528-532.

Kim et al., "Data Hiding on H.264/AVC Compressed Video", Image Analysis and Recognition; [Lecture Notes in Computer Science], Springer Berlin Heidelberg, Berlin, Heidelberg, Aug. 22, 2007, pp. 698-707.

Donoho, D., "Compressed sensing", IEEE Trans. on Information Theory, vol. 52, No. 4, Apr. 2006, pp. 1289-1306.

Dadkhah et al., "Compressive sensing with modified total variation minimization algorithm", In Proceedings of IEEE ICASSP, (2010), pp. 1030-1033.

Do et al: Compressive sending with adaptive pixel domain reconstruction for block-based video coding, In Proceedings of ICIP, pp. 3377-3380, Sep. 26-29, 2010.

Dadkhah et al: Compressive sensing with modified total variation minimization algorithm; In Proceedings of IEEE ICASSP, pp. 1030-1033, Mar. 14-19, 2010.

Y. Zhang et al: A novel image/video coding method based on compressed sensing theory, In Proceedings of IEEE ICASSP, pp. 1361-1364, Apr. 2008.

Candes et al: Robust uncertainty principles: Exact signal reconstruction from highly incomplete frequency information, IEEE Trans. on Information Theory, vol. 52, pp. 489-509, Feb. 2006.

Search Report dated Jan. 5, 2012.

* cited by examiner

METHOD AND DEVICE FOR LOSSY ENCODING DATA AND CORRESPONDING DEVICE FOR RECONSTRUCTING DATA

This application claims the benefit, under 35 U.S.C. §365 of International Application PCT/CN2011/000705, filed Apr. 22, 2011, which was published in accordance with PCT Article 21(2) on Oct. 26, 2012 in English.

TECHNICAL FIELD

The invention is made in the field of lossy encoding data having at least one of image data and audio data.

BACKGROUND OF THE INVENTION

Lossy encoding tries to represent data, e.g. audio or video data, with as few bits as possible while at the same time trying to allow the data to be reconstructed from the lossy encoded representation as good as possible.

To achieve this goal, commonly a rate-distortion cost function is defined. Minimizing this function then allows for a lossy compression scheme which delivers the best trade-off between encoding costs in terms of bitrate and information loss in terms of distortion of reconstructed data with respect to original data.

Reconstructing the data may comprise post-processing. That is, first a preliminary reconstruction of the data is generated using the information contained in the encoded data. Then, a post-processing method is applied for regaining that part of information which was removed from the original data by lossy compression.

An example thereof is the removal of film grain noise from image data in course of lossy compression and subsequent addition of simulated film grain noise to a preliminary reconstruction obtained from the lossy encoded image data.

Another exemplary source of distortion is quantization. For compressing video or audio data, the data is commonly predicted using already encoded data. The residual remaining form prediction is the transformed from spatial and/or temporal domain to frequency domain using, for instance, discrete cosine transformation or wavelet transformation. The resulting coefficients then are quantized. Finally, the quantized coefficients are encoded using, e.g., Huffman coding or arithmetic encoding.

Quantization can be non-linear such that the coefficients are thinned out or sparsified, i.e. only a sub-set of the frequency information is maintained. This is similar or identical to linear quantization combined with modification. E. Candes, J. Romberg, and T. Tao, "Robust uncertainty principles: Exact signal reconstruction from highly incomplete frequency information," IEEE Trans. on Information Theory, vol. 52, pp. 489-509, February 2006, proved theoretically that, anyway, image can be exactly reconstructed from such sub-set using appropriate post-processing.

Y. Zhang, S. Mei, Q. Chen, and Z. Chen, "A novel image/video coding method based on compressed sensing theory," In Proceedings of IEEE ICASSP, pp. 1361-1364, April 2008, proposed a method of image/video coding by employing transform coefficient subsampling and total variation (TV) minimization based post processing of preliminary block reconstruction in the residue domain.

M. R. Dadkhah, S. Shirani, M. J. Deen, "Compressive sensing with modified total variation minimization algorithm", In Proceedings of IEEE ICASSP, pp. 1030-1033, Mar. 14-19, 2010, mention exploiting Norm-1 post-processing for image reconstruction.

Another example of the use of total variation-minimization-based post processing can be found in T. T. Do, X. Lu, J. Sole, "Compressive sensing with adaptive pixel domain reconstruction for block-based video coding", In Proceedings of ICIP, pp. 3377-3380 Sep. 26-29, 2010. Therein, a video encoder is proposed which selects between a new coding mode using adaptive total variation minimization block recovery and existing H.264 modes. An additional flag, denoted as CS-flag, is employed to mark the selected coding mode. The decoder reads the CS-flag and then executes the appropriate reconstruction algorithm corresponding to the CS mode or the normal modes.

SUMMARY OF THE INVENTION

The inventors of the current invention identified the problem that transmission of a flag whether to perform post processing like total variation (TV) regularization results in significant overhead in the bit-stream, especially for the low bit-rate compression. This problem even intensifies in case several post-processing methods can be used and thus have to be signalled.

The inventors realized that the modification of quantized coefficients can be used for signalling the post-processing method.

Therefore, it is proposed a method according to claim 1 for lossy encoding data comprising at least one of image data and audio data. Said method comprises determining quantized coefficients using a quantization of a discrete cosine transformed residual of a prediction of said data. Said method further comprises modifying said quantized coefficients for minimizing rate-distortion cost wherein distortion is determined using a post-processed reconstruction of the data, the post-processed reconstruction being post-processed according to a post-processing method, and encoding said modified coefficients. In said proposed method, the post-processing method is that one of n>1 different predetermined post processing method candidates whose position in an predetermined order of arrangement of the post processing method candidates equals a remainder of division, by n, of a sum of the modified coefficients.

Doing so removes the overhead of flags in the bit stream.

In an embodiment these steps are executed using processing means adapted correspondingly.

The inventors further propose non-transitory means at least partly dedicated for at least one of storage and transmission of a compress-encoded data comprising at least one of image data and audio data, the data being compress-encoded according to the said proposed method for lossy encoding.

A corresponding method according to claim 7 for reconstructing data comprising at least one of image data and audio data, comprises decoding coefficients, using processing means for determining a preliminary reconstruction of the data using the decoded coefficients, and determining a reconstruction of the data by post-processing the preliminary reconstruction using that one of n>1 different predetermined post processing method candidates whose position in an order of arrangement of the post processing method candidates equals a remainder of division, by n, of a sum of the decoded coefficients.

Furthermore, corresponding devices according to claims 12 and 13 are proposed.

The features of further advantageous embodiments are specified in the dependent claims.

BRIEF DESCRIPTION OF THE DRAWINGS

Exemplary embodiments of the invention are illustrated in the drawings and are explained in more detail in the following description. The exemplary embodiments are explained only for elucidating the invention, but not limiting the invention's disclosure or scope solely defined by the claims.

In the figures.

EXEMPLARY EMBODIMENTS OF THE INVENTION

Figure 1:
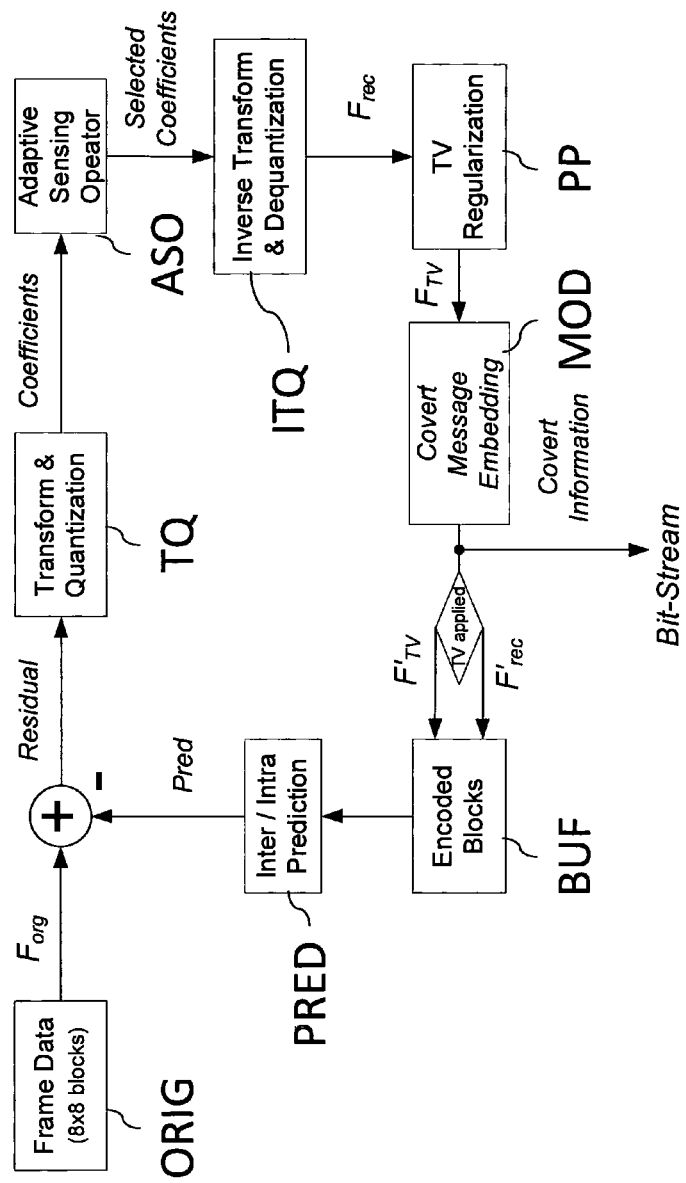
FIG. 1 depicts an exemplary flow chart of the encoding procedure according to the invention.
Figure 2:
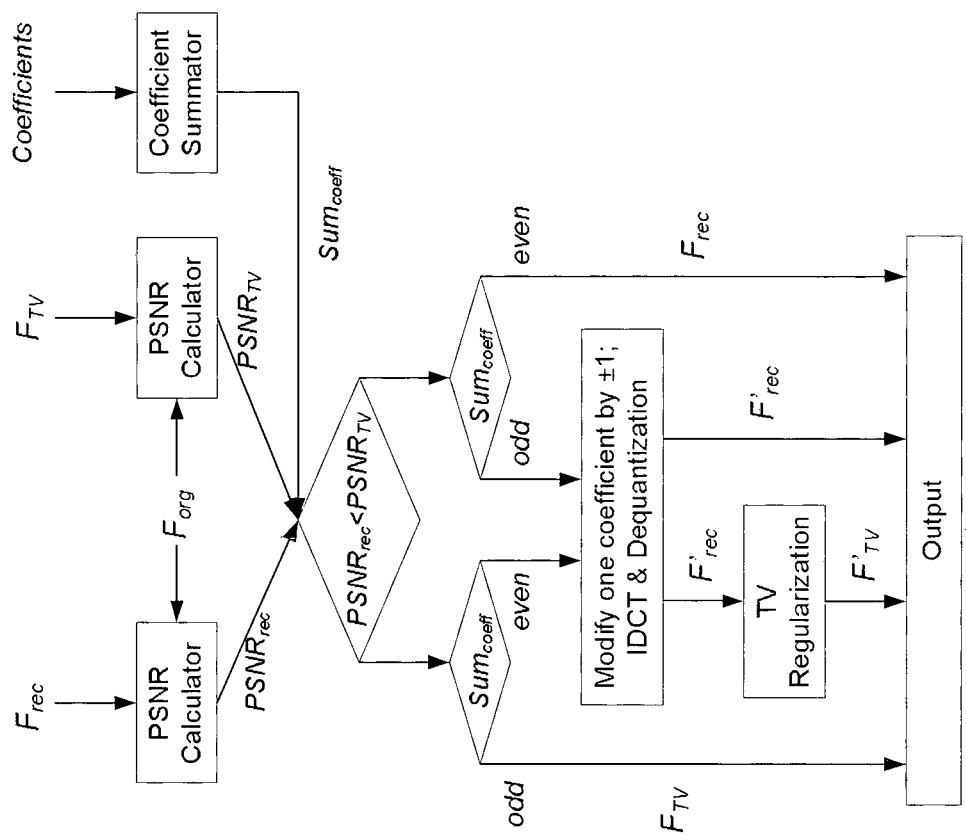
FIG. 2 depicts an exemplary flow chart of embedding covertly information on post processing in a bit stream.
Figure 3:
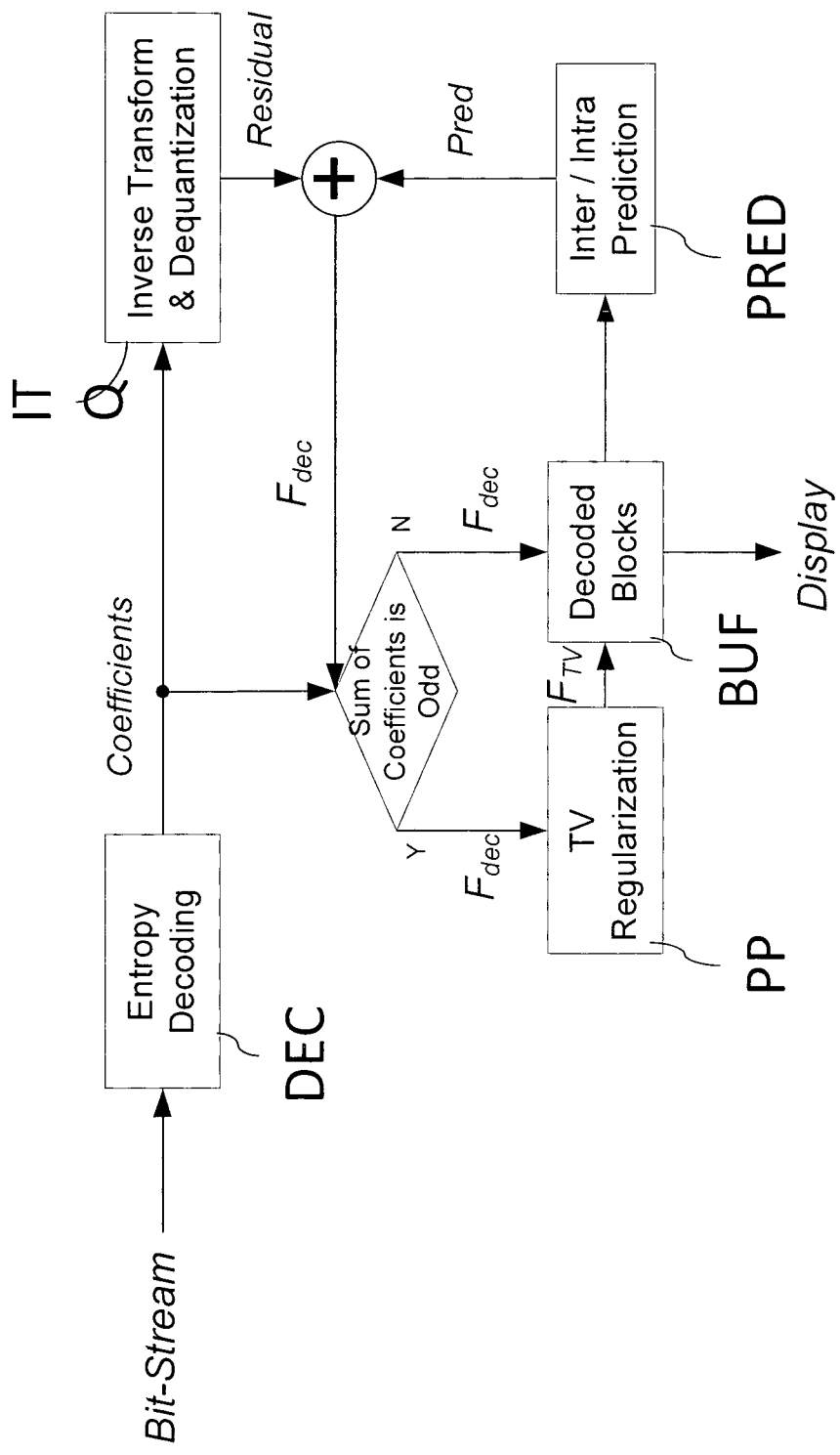
FIG. 3 depicts an exemplary flow chart of the decoding procedure according to the invention.

The invention may be realized on any electronic device comprising a processing device correspondingly adapted. For instance, the invention may be realized in a television, a mobile phone, a personal computer, a digital still camera, a digital video camera, an mp3-player, a navigation system or a car audio system.

In an exemplary embodiment, the invention is used for encoding an image composed of image pixels. In said embodiment a residual between a block of image pixels yet-to-be encoded and a prediction of said block is determined. The prediction is determined using already encoded image pixels. Next, a transformation from spatial domain to frequency domain, such as discrete cosine transform, is applied on the residual. From the transformation result a sequence of quantized coefficients is generated by quantization and scanning according to a scan order wherein it is unimportant whether quantization or scanning occurs first.

Among the quantized coefficients, for further modification those are selected which are of reduced relevancy for the human visual system, e.g. coefficients associated with frequencies above a threshold associated with human perceptive sensitivity. This ensures that subsequent modification does not lead to distortions of extreme saliency to the user.

Then, among the selected coefficients, those are determined which are positive valued and do not exceed a positive threshold and which further are contained in contiguous sub-sequences of at least a positive number of Zero valued coefficients, i.e. each determined coefficient is the only non-zero valued coefficient in the corresponding sub-sequence.

All the determined coefficients may be set to Zero which leads to compression without impacting image quality significantly. Or, rate-distortion cost optimization can be used for identifying, among the determined coefficients, and setting to Zero those which, when set to zero, lead to an improvement of rate-distortion cost.

Doing so provides an adaptive compressive sensing based video coding scheme which adaptively selects the coefficients that are the most efficient in representing video frames.

Rate-distortion cost optimization can take into account one or more post-processing methods like total variation regularization, also called total variation minimization, or $l_1$ minimization, also called Norm-1 minimization, the one or more post-processing methods being arranged, together with a dummy post-processing method representative of no post processing, in an order, i.e. each post-processing has an associated ordinal number.

Thus, in an embodiment it is determined whether post-processing improves the quality of the restored images as well as the post processing which improves quality the most.

Then, modification of the determined coefficients can be made such that a remainder of division, by n, of a sum of the all coefficients including the modified ones is equal to the ordinal number of that post processing method which is best suited for minimization of the distortion. For making easier achieving of this equality, even coefficients associated with frequencies below or at the perceptivity threshold can be modified. Further or as an alternative, achieving of this equality can be made in an iterative fashion, i.e. a preliminary suitable post-processing is determined, then coefficients are modified to achieve said equality, in response to which it is either verified that the preliminary determined post-processing is still suitable, or a new preliminary suitable post-processing is determined which triggers further modification.

In practice, it was found that a single iteration was sufficient in the rare cases where the verification of a first preliminary determined post-processing failed.

Finally, there is encoded the resulting coefficients together with information allowing a decoder to determine the prediction.

Doing so enables signalling, in a bit stream comprising encoded quantized coefficients determined using a quantization of a discrete cosine transformed residual of a prediction of a block of pixels of an image, a post processing method being the one of n>1 different, sorted and predetermined post processing method candidates which minimizes distortion when used for reconstructing the block using said encoded coefficients and said prediction.

That is, information is sent in a covert communication channel whether and/or which post processing improves image restoration best.

A varying quantization parameter can be used for quantization. In that case, at least one of the positive threshold and the minimum positive number of Zero-valued coefficients per sub-sequence can vary too in dependency on the quantization parameter.

For reconstructing a block of pixels of an image encoded in such way, coefficients and information allowing a decoder to determine the prediction are decoded. Next, a remainder of division, by a predetermined positive number n, of a sum of the decoded coefficients is determined. For reconstructing the residual, the decoded coefficients are de-quantized and inverse transformed and, for reconstructing the prediction the decoded information is used. Then, prediction and residual are combined. The remainder of the divison is used for selecting a candidate post-processing which is then applied on the combination of reconstructed residual and reconstructed prediction for determining the final reconstruction of the block.

An exemplary embodiment of an encoding device scans the coefficients after DCT and quantization of each block, and finds isolated small coefficients (e.g., an isolated 1 in the middle of a number of successive zeros) which do not contribute to the reconstruction quality significantly. Then such coefficients are discarded since this probably degrades the quality slightly but reduces the bit-rate much. Thus, only the significant coefficients are selected and written into the bit-stream.

Additionally or alternatively, the exemplary embodiment of the encoding device is capable of choosing adaptively among $l_1$ minimization, total variation minimization and skipping post-processing and indicating the choice by Covert Communication.

In many cases, post-processing modes, e.g. total variation (TV) minimization, work well on compensating the distortion caused by quantization and/or coefficient discarding, meanwhile, sometimes they fail. The exemplary embodiment of the encoding device can process each block and computes the distortion, e.g. by computing PSNR. If the quality improves, it embeds the message of "to do TV regularization" into the bit-stream in a covert communication channel.

An instance of covert messages is that, if TV regularization is required at the decoder and TV regularization is the only available candidate post processing method besides no post processing, the sum of the coefficients shall be odd; otherwise, the sum shall be even. For the case of 3 available post-processing modes, modulus-3 will be used instead of parity-check.

Since the sum of coefficients not necessarily is odd in case TV regularization is useful and not necessarily is even in case no post processing is preferable, coefficients sometimes need to be modified. This is best done in a way which reduces bit rate and minimizes distortion resulting from such modification, i.e. not only ensures sum of modified coefficients having correct parity but further minimizes rate-distortion cost.

Since human eye is far more sensitive to variations in lower frequency components the modification preferably is being carried out on higher frequency components above a threshold.

And, since encoding small and isolated coefficients requires comparably many bits the modification preferably is being carried out on small and isolated high frequency components.

Therefore, in an embodiment also comprising discarding of small and isolated high frequency components, anyway, sum of the coefficients can be controlled by not discarding all of the small and isolated coefficients and/or by not discarding but only reducing some or all of these coefficients.

The inventive principles set forth in the claims were tested in an exemplary encoder built upon the H.264 codec. For simplicity, only 8×8 transform was used, however, the proposed method is also suitable for other block sizes such as 4×4. Furthermore, only TV regularization was considered for post-processing.

The tested exemplary encoder goes through these steps: Given the quantization parameter (QP) of H.264 compression, the tested exemplary encoder calculates at least the parameters Threshold_Run, Threshold_Level, TV_lambda. These calculated parameters satisfy that the Adaptive Sensing Operator or TV Regularization module can achieve the optimal compression at each QP. The parameters Threshold_Level and Threshold_Run have been optimized for each QP using a training set of various video sequences.

The tested exemplary encoder obtains the residual data by subtracting the inter/intra prediction from the original block Forg, which is then transformed, quantized, and arranged in a sequence by scanned according to a predetermined scan order, e.g. the various frequency components are zigzag reordered.

An Adaptive Sensing Operator ASO realized in the tested exemplary encoder then tries to represent the frame as accurate as possible at a relatively low bit cost. To do so, the coefficients with small magnitudes that consume many bits are examined as to whether they can be discarded. This is achieved by investigating the sequence of the coefficients. For each Coefficient C that stays ahead of a successive zeros and after b successive zeros, if C≤Threshold_Level and a+b≥Threshold_Run, C is candidate to be set to zero.

Rate-Distortion optimization is employed by Adaptive Sensing Operator ASO to determine whether to set to zero the detected candidate coefficients.

In consideration of subjective quality, the Adaptive Sensing Operator ASO is adapted for excluding the beginning 25 coefficients which are sensitive to human eye from being set to zero.

For each candidate coefficient actually set to zero the bits for a level value and a run-length value are saved without degrading the quality significantly.

To alleviate the quality loss caused by quantization and coefficient dropping, TV minimization in principle is beneficial. But, although parameter TV_lambda has been optimized for a given quantization parameter based on various videos, there is still a possibility that TV regularization actually degrades quality even.

In a post-processing module PP, the tested exemplary encoder therefore tentatively applies TV regularization on the reconstructed block Frec, obtaining block FTV. Then, the exemplary encoder evaluates the quality of Frec and FTV by comparison with the original data Forg. If the distortion of FTV is smaller, the tested exemplary-encoder signals TV regularization to be used at decoder side for output as well for prediction.

The tested exemplary encoder therefore embeds the message of whether to use TV regularization into the bit-steam. If TV regularization makes quality better and thus is required, the sum of coefficients shall be odd; otherwise, the sum even. The tested exemplary encoder then computes the sum of coefficients and checks whether the parity follows the above rule, i.e. whether parity fits to applicability of post processing according to a rule present in encoder and decoder. If not, the tested exemplary encoder modifies, in module. MOD, one of the remaining non-zero coefficients or one of the discarded small and isolated high frequency coefficients by 1 or −1 to meet this requirement.

For the sake of impact on visibility, the frequency of the modified coefficient shall be as high as possible. For the sake of bit rate, the frequency of the modified coefficient shall be as high as possible. Therefore, rate-distortion cost minimization can be used to determine which of the different frequency components to modify as well as how to modify.

As search space for this determination is large, the following prioritization is applied in the exemplary encoder tested:

If any discarded coefficients are odd: Restore the one associated with the lowest frequency or the one whose discarding resulted in greatest additional distortion.

Only, if the discarded coefficients are all even: Modify one of the discarded coefficients by ±1.

If no coefficient was discarded: Modify one of the nonzero coefficients by ±1.

It was determined advantageous if the absolute of the modified coefficient is reduced.

Since modification may affect the usefulness of TV regularization, evaluation of TV regularization's effect on distortion and modification of coefficients are re-done until parity of coefficients equals the preferable way of reconstruction.

Finally, the block reconstructed from the finally resulting coefficients is saved in the buffer as a candidate for prediction of blocks to-be-encoded; and the finally resulting coefficients are entropy encoded and written into the bit-stream, on a non-transitory storage medium or are transmitted as a signal.

An exemplary embodiment of a device for reconstructing data encoded as such receives the encoded coefficients and decodes them. Then the device determines parity of the coefficients. Parity being odd informs the exemplary decoder that TV regularization can be applied beneficially. Parity being even informs the exemplary decoder that computational effort of TV regularization can be omitted without impairing image quality. Next, the exemplary decoder applies inverse quantization and inverse transformation on the coefficients. The resulting coefficients are arranged in a block corresponding to the predetermined scan order used at encoder side. This results in a reconstructed residual which is combined with the prediction resulting in a decoded block FDEC. Finally, post processing is applied or omitted depending on parity of the decoded coefficients.

The invention claimed is:

1. A method for lossy encoding data having at least one of image data or audio data, said method comprising:
   determining quantized coefficients using a quantization of a discrete cosine transformed residual of a prediction of said data;
   modifying said quantized coefficients for minimizing a rate-distortion cost, wherein distortion is determined using a post-processed reconstruction of the data, the post-processed reconstruction being post-processed according to a post-processing method; and
   encoding said modified quantized coefficients;
   wherein the post-processing method is that one of n>1 different given post processing method candidates whose position in an given order of arrangement of the post processing method candidates equals a remainder of division, by n, of a sum of the modified coefficients.

2. The method of claim 1, wherein the reconstruction is determined using said modified coefficients and said prediction, said prediction being determined using already encoded data and a reference to the already encoded data is further encoded.

3. The method of claim 1, wherein the modifying said quantized coefficients further comprises:
   determining that a difference unequal to Zero exists between a remainder of division, by n, of a sum of the quantized coefficients and the position of that one of n different, ordered and given post processing method candidates which minimizes distortion when used for reconstructing said block using said quantized coefficients and said prediction; and
   modifying the quantized coefficients such that overall modification equals the non-Zero difference.

4. The method of claim 3, further comprising:
   repeating said determining that a difference unequal to Zero exists and modifying the quantized coefficients such that overall modification equals the non-Zero difference; and
   using in each repetition of said determining that a difference unequal to Zero exists the modified coefficients resulting from immediately preceding execution of said modifying the quantized coefficients such that overall modification equals the non-Zero difference until existence of a difference unequal to Zero is not determined.

5. The method of claim 1, wherein the data and the quantized coefficients are arranged as two-dimensional blocks and said modifying the coefficients further comprises:
   determining a sequence of coefficients by scanning the quantized coefficients according to a scan order and using the sequence for determining those quantized coefficients which each:
      represents a frequency above a given frequency threshold,
      does not exceed a given positive threshold, and
      is the only non-Zero coefficient contained in contiguous subsequence of at least a given positive number of quantized coefficients, and
   identifying, among the determined coefficients, those which, when set to zero, lead to minimization of rate-distortion cost and setting the identified coefficients to Zero.

6. The method of claim 5, further comprising determining a quantization parameter for said quantization, wherein at least one of the positive threshold and the positive number depends on the determined quantization parameter.

7. The method of claim 1, wherein one of the post processing method candidates comprises total variation regularization.

8. The method of claim 1, wherein one of the post processing method candidates comprises $l_1$ minimization.

9. The method of claim 1, wherein one of the post processing method candidates comprises a dummy post processing method which does not process at all.

10. A method for reconstructing data having at least one of image data and audio data, said method comprising:
    decoding coefficients;
    determining a preliminary reconstruction of the data using the decoded coefficients; and
    determining a reconstruction of the data by post-processing the preliminary reconstruction using that one of n>1 different given post processing method candidates whose position in an order of arrangement of the post processing method candidates equals a remainder of division, by n, of a sum of the decoded coefficients for minimizing a rate-distortion cost.

11. The method of claim 10, wherein one of the post processing method candidates comprises total variation regularization.

12. The method of claim 10, wherein one of the post processing method candidates comprises $l_1$ minimization.

13. The method of claim 10, wherein one of the post processing method candidates comprises a dummy post processing method which does not process at all.

14. Device for lossy encoding data having at least one of image data and audio data, comprising:
    processing means adapted for determining quantized coefficients using a quantization of a discrete cosine transformed residual of a prediction of said data, the processing means being further adapted for modifying said quantized coefficients for minimizing a rate-distortion cost, wherein distortion is determined using a reconstruction of the block post-processed according to a post-processing method;
    encoding means adapted for encoding said modified coefficients wherein the post-processing method used for distortion determination is that one of n>1 different given post processing method candidates whose position in an given order of arrangement of the post processing method candidates equals a remainder of division, by n, of a sum of the modified coefficients.

15. A device for reconstructing data having at least one of image data and audio data, comprising:
    decoding means adapted for decoding coefficients; and
    processing means adapted for determining a preliminary reconstruction of the data using the decoded coefficients;
    wherein the processing means are further adapted for determining a reconstruction of the block by post-processing the preliminary reconstruction using that one of n>1 different given post processing method candidates whose position in an order of arrangement of the post processing method candidates equals a remainder of division, by n, of a sum of the decoded coefficients for minimizing a rate-distortion cost.

* * * * *